Aug. 8, 1939.  G. SUNDBACK  2,169,177
METHOD OF MANUFACTURING SEPARABLE FASTENERS
Original Filed June 2, 1933
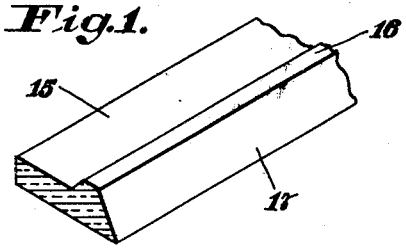
Fig. 1.
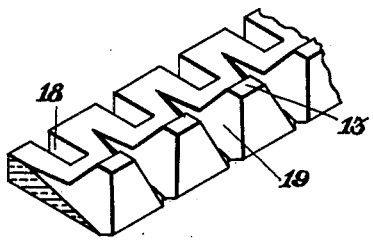
Fig. 2.
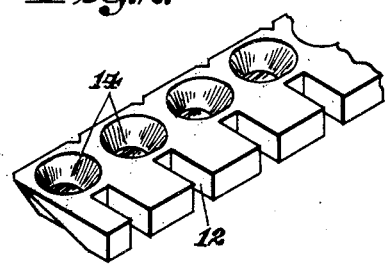
Fig. 3.
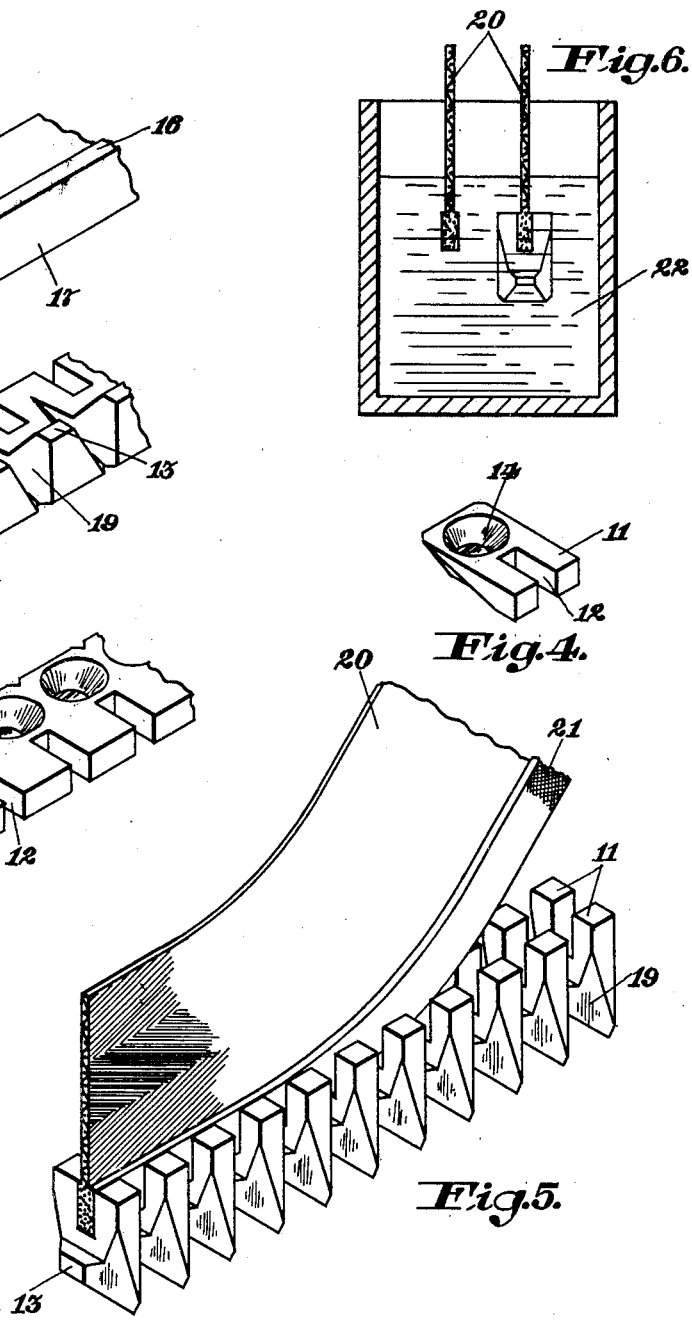
Fig. 4.
Fig. 5.
Fig. 6.
INVENTOR.
Gideon Sundback
BY Kelley and Chisholm
ATTORNEYS.

Patented Aug. 8, 1939

2,169,177

UNITED STATES PATENT OFFICE 2,169,177

METHOD OF MANUFACTURING SEPARABLE FASTENERS

Gideon Sundback, Meadville, Pa., assignor to Talon, Inc., Meadville, Pa., a corporation of Pennsylvania Application June 2, 1933, Serial No. 674,056
Renewed November 1, 1937

8 Claims. (Cl. 18—59)

This invention relates to the art of manufacturing separable interlocking fasteners and more particularly fasteners of the type described in the application of Corner, Serial No. 637,984, filed October 15, 1932, now Patent 1,920,138, and to processes of making the same.

In producing commercially the individual fastener members for sticking on the tape in the manner disclosed in the Corner application, the irregularly shaped members must be made in large numbers at relatively low cost. At the same time, they must be formed very accurately to the desired shape and applied to the tape while maintaining their accurate shape.

One of the objects of the present invention is to provide an improved method of forming the fastener members to their final shape prior to sticking on the tapes. Preferably the fastener members are formed from a solid blank or blanks by cutting operations.

Another object is to provide a strip of non-metallic fastener members in such form that they may be easily cut apart and applied to the tapes. Still another object is to provide improvements in the method of sticking the fastener members on the tape.

A further object is to provide a simple and effective means for removing sharp corners and tool marks from the fastener members.

The material to be used for making the fastener members may be secured from a wide range of plastics as suggested in the above mentioned Corner application. I have found that cellulose nitrate (commonly known as Pyralin or Celluloid and cellulose acetate) are especially suitable for this process. These materials may be machined easily and rapidly so that a large number of fastener members may be produced at the minimum expense and time. There are many known resinous materials which may be adapted for my purpose and I do not wish to be limited to the specific materials mentioned.

Other objects and advantages of the invention will more fully appear upon reading the following specification.

In the accompanying drawing I have shown for purposes of illustration, one embodiment which my invention may assume in practice. In the drawing:

Fig. 1 is a perspective view of the non-metallic strip used for forming fastener members;

Fig. 2 is a perspective view of the strip formed into a series of connected fastener members;

Fig. 3 is a perspective view illustrating the opposite side of the strip of connected fastener members;

Fig. 4 is a perspective view of an individual fastener member severed from the strip;

Fig. 5 illustrates the step of assembling the fastener members on the tape; and

Fig. 6 illustrates a method of sticking the fastener members on the tape by a solvent.

The invention illustrated is adaptable to a wide range of shapes and sizes as will be readily apparent to those skilled in the art. The fastener member illustrated has a flat portion 11, providing attaching means in the form of a tape receiving slot 12, and an interlocking portion at the other end with a projection 13 on one side and a correspondingly shaped recess 14 on the opposite side. The strip of material has a cross-section corresponding to one of the plane projections of the fastener member preferably corresponding to the side elevation. Thus, the strip illustrated in Fig. 1 has a flat base portion 15 and a rib portion 16 extending along one side. The side of the strip and the side of the projection form a common inclined surface 17.

By suitable cutting tools such as rotary milling tools, notches 18 are cut in the base portions at uniformly spaced intervals and notches 19 through the ribbed portion to provide pyramidal shaped projections 13 of the fastener members. On the opposite side of the strip directly in line with the slots 18 are formed the recesses 14 which are preferably of elongated conical shape. The recesses may be formed by removing material from the solid strip by suitable cutting tools. The fastener members are next cut apart midway between the slots 18 to form individual fastener members. These fastener members are now in their final form to be assembled with and stuck to the tape without change of shape of the member.

The sticking of the fastener members on the tape may be accomplished by cementing, gluing or by temporarily softening the fastener member jaws. Preferably the fastener members are grouped in accurately spaced relation as illustrated in Fig. 5 and a fabric tape 20 having a thickened edge 21 is inserted in the aligned slots 18 of the group of fastener members. The thickened edge may be formed in any suitable manner such as by folding the tape back on itself. The thickened edge of the fabric may have rayon threads woven in, which will soften in the same solvent as the fastener member. The threads are thus welded to the fastener member resulting in an even more intimate union with the fabric. A thin strip of soluble plastic material may be placed between the folds of the fabric for a similar reason.

The fastener members may now be assembled on the dry tape and held there temporarily by friction, the thickened edge of the tape fitting closely in the slots of the fastener members. Care must be used, however, to avoid displacing the fastener members before they are finally stuck firmly in position.

As illustrated in Fig. 6, the fastener member and tape are dipped in a solution 22. In the case of cellulose nitrate and cellulose acetates, any of the known solvents, for example, acetone, may be used. The solvent may vary in accordance with the particular material employed. The time of immersion is just sufficient to saturate the tape thoroughly with the solvent. The solvent acting on the tape contacting surfaces softens the material sufficiently to cause it to adhere firmly to the fabric. At the same time, the sharp corners and tool marks are removed by the solvent and when the stringer is dry the fastener members have a smooth polished appearance. The fastener member is not completely softened and accordingly no deformation from the original shape takes place. In the case of Pyralin fastener members, I have found that about thirty seconds dipping time is sufficient, but the time may be varied over a considerable range and will depend to some extent on the kind of tape used. The stringers are dried for a few minutes after removing from the solution, care being taken to keep the fastener members out of contact with each other and out of contact with other bodies. When the drying has progressed to the stage where the material is not tacky, the stringers are preferably placed between two plates or rollers and slight pressure applied to smooth out any imperfections in the surfaces of the fastener members. This operation may be dispensed with if the cutting tool used leaves smooth surfaces.

The above described method of attaching the fastener members to the tapes may be used wherever soluble materials are selected, but it may be desired to make the fastener members of a phenolic resin, such as "Bakelite". While some of the phenolic resins are soluble in the intermediate stages, and may be stuck in the manner described to the tapes while soluble, and hardened afterward, a modification of the method may be employed for sticking insoluble members on the tape. For example, the tape may be treated with a suitable cement which will firmly adhere to the fastener members, or the tape contacting surfaces of the members may be covered with a varnish or solution of a soluble plastic material which will adhere firmly to the insoluble fastener members. They may then be dried and applied to the tape by the solvent process above described.

Instead of assembling the fastener members in groups on the dry tape, the tape may be first dipped in a solvent as indicated in the left hand portion of Fig. 6, and as soon as the tape is inserted in the slots of the fastener members, it adheres firmly thereto. Still another modification would be to assemble the dry fastener members on the tape, saturate the contacting surfaces by dipping the free edge of the tape in a solvent, and allow the solvent to penetrate to the attaching surfaces by capillary attraction.

As a result of my invention it will be observed that fastener members of the required shape and size may be made in large numbers at low cost.

The fastener members may be formed accurately and assembled on flexible supports without any bending or distortion from such accurate form. Several modifications will now readily suggest themselves after a full understanding of my invention. For example, the strips of integrally connected fastener members may be molded from plastic material in a fluid or semi-fluid state, and I desire to cover such a strip, however formed. On the other hand, I believe it to be much better to cut the members to shape from solid pieces of non-metallic material. I have illustrated in this application one embodiment and have suggested certain modifications which my invention may assume in practice, but it will be understood that this embodiment is merely for the purpose of illustration and description and other forms may be devised within the scope of my invention defined in the appended claims.

What I claim as my invention is:

1. In the manufacture of separable interlocking fasteners, the steps of preparing a strip of plastic material, including a longitudinally extending rib, cutting notches in said rib to divide it into projections, cutting said strip between said projections to form separate interlocking members, and sticking the members to the edge of a flexible stringer by sufficiently softening portions of the members.

2. In the manufacture of separable interlocking fasteners, preparing a blank strip of non-metallic material, said strip including a longitudinally extending rib and having a cross-section corresponding to a side elevation of a fastener member, cutting notches in said rib to divide it into a series of projections, cutting slots in said strip opposite said projections, cutting depressions in the side of said strip opposite said projections, and severing said strip between said projections to form individual fastener members each having a projection, recess and slot.

3. In the manufacture of separable fasteners, cutting from a solid piece of plastic material a blank strip having a solid cross-section with a rib along one edge, cutting notches through said rib to divide it into a series of projections, cutting parallel sided slots along the opposite edge in line with said projections, cutting a corresponding series of recesses on the side of said strip opposite said projections and severing said strip between said projections to form individual members each having a projection, slot and recess.

4. The method of making separable interlocking fasteners comprising forming fastener members of soluble cellulosic plastic material, and sticking the fastener members to a fabric tape having some of its threads soluble in the same solvent as said plastic material, by softening the threads and fastener member by said solvent sufficiently to stick them together.

5. The method of making separable interlocking fasteners comprising forming fastener members from soluble plastic material with interlocking heads at one end and tape receiving slots at the other end, assembling said fastener elements in uniformly and closely spaced relation on the edge of a tape by inserting the edge of the tape while dry in said slots, said tape being of substantially the same thickness as the width of said slots whereby the fastener members are held in place temporarily by friction, and then dipping the assembly in a suitable solvent whereby the fastener members are softened sufficiently to stick them to the tape.

6. The method of making separable interlocking fasteners comprising forming fastener members of cellulosic plastic material by cutting material solely from a solid blank or blanks, each of said members having an interlocking projection and recess at one end and a tape receiving slot at the other end, grouping a series of said members in uniformly closely spaced relation with all of said slots aligned, inserting the edge of a fabric tape in said slots while dry and then dipping the assembly in a solvent of the material for a sufficient time to stick the fastener members and tape together and to smooth up the surfaces of the fastener members.

7. The method of forming fastener members for separable interlocking fasteners, which comprises forming a hardened strip of plastic material, the cross-section of the strip conforming in size and shape to one of the plane projections of a finished fastener member, cutting material from said strip to provide a series of connected fastener members each having an interlocking recess, a projection opposite the recess, and a parallel-sided tape receiving slot, and severing the strip between the projections, recesses and slots to provide individual fastener members.

8. The method of forming fastener members for separable interlocking fasteners which comprises molding from plastic material strips of integrally connected fastener members arranged side by side and having a series of interlocking projections on one side and a series of corresponding recesses on the opposite side with tape receiving slots in line with said projections and recesses, cutting said strip transversely between said projections and recesses to form individual fastener members, and assembling said fastener members in uniformly and closely spaced relation on the edge of a tape by inserting the edge of the tape in said slots, said tape being of substantially the same thickness as the width of said slots whereby the fastener members are held in place temporarily by friction and then dipping the assembly in a suitable solvent whereby the fastener members are softened sufficiently to stick them to the tape.

GIDEON SUNDBACK.